(12) United States Patent
Shelton (10) Patent No.: US 9,109,925 B2
(45) Date of Patent: Aug. 18, 2015

(54) SHAFT ANGLE MEASUREMENT (75) Inventor: Christopher David Shelton, London (GB)

(73) Assignee: Autonnic Research, Ltd. (GB)

( * ) Notice: Subject to any disclaimer, the term of this patent is extended or adjusted under 35 U.S.C. 154(b) by 565 days.

(21) Appl. No.: 13/510,324

(22) PCT Filed: Nov. 16, 2010

(86) PCT No.: PCT/GB2010/051912
§ 371 (c)(1),
(2), (4) Date: Jul. 27, 2012

(87) PCT Pub. No.: WO2011/061530
PCT Pub. Date: May 26, 2011

(65) Prior Publication Data
US 2012/0280679 A1 Nov. 8, 2012

(30) Foreign Application Priority Data
Nov. 17, 2009 (GB) .................................. 0920117.9

(51) Int. Cl.
*G01B 7/30* (2006.01)
*G01D 5/244* (2006.01)
*G01D 5/20* (2006.01)
*G01D 5/14* (2006.01)

(52) U.S. Cl.
CPC ............ *G01D 5/24476* (2013.01); *G01D 5/147* (2013.01); *G01D 5/2033* (2013.01)

(58) Field of Classification Search
CPC .................................................... G01D 5/2033
USPC ............... 324/207.15–207.22, 232, 235, 239; 310/40 R, 231
See application file for complete search history.

(56) References Cited

U.S. PATENT DOCUMENTS

| 6,288,535 B1 * | 9/2001 | Chass ........................ 324/207.2 |
| 2008/0315870 A1 * | 12/2008 | May .............................. 324/239 |

FOREIGN PATENT DOCUMENTS

DE 19813497 * 9/1999

* cited by examiner

*Primary Examiner* — Reena Aurora
(74) *Attorney, Agent, or Firm* — J. Wiley Horton (57) ABSTRACT

A magnetic angle sensor system for determining a shaft angle for one or more pivoting or rotating shaft means. The or each of said shaft means is provided with means adapted to generate a magnetic field, such that means can be energised in turn to induce a magnetic field in a detector. In a first step the sensor arrangement measures the background field in the absence of any current in the wire or solenoid, such that the angle of the shaft means can be determined from the magnetic field in the solenoid and the background field. The invention concerns the use of an evoked response field whether alternating or steady whereby the angle is determined by the difference in field when the evoking magnetic stimulus is present from when it is absent.

18 Claims, 6 Drawing Sheets

SHAFT ANGLE MEASUREMENT

This invention relates to a means to measure angle, such as that of a shaft, by non-contact magnetic means and in particular to where two or more such shafts are located close to one another in use.

In known magnetic angle sensor systems there are typically two magnetic sensors arranged orthogonally so as to detect the magnitude of the field in the plane of the sensors and from the orthogonal magnitudes the angle of the field in that plane can be calculated.

Such fields can be constant or steady, as in the case of a compass, or permanent or alternatively alternating. Examples of steady field detectors are Hall effect devices, fluxgate devices or other permeability modulation detectors and the orthogonal sensors can either be discrete or combined as a pair such as with monolithic Hall devices or the two outputs of a ring fluxgate. For alternating fields, the detector means would also include turns of conductors with or without ferromagnetic cores.

An example of the constant field can be illustrated by the case of a permanent magnet being placed on the end of a shaft. The shaft angle can be resolved from the fields detected by two orthogonal detectors in a plane at right angles to the axis of the shaft. Such angle detection is well-known but a problem arises when two or more shafts are in close proximity as the fields from the magnets may combine and the determination of the angle of one shaft cannot completely be disassociated from that of the other. Also the angle of either is corrupted by ambient fields including that of the Earth's magnetic field.

The present invention seeks to provide a magnetic angle sensor system for use in determining the position of a plurality of pivot points such as shafts where the pivot points are located in close proximity to one another or are co-axial.

According to the invention there is provided a magnetic angle sensor system for determining the position of one or more of a plurality of co-axial pivot points, wherein the or each of said pivot points is provided with means adapted to generate a magnetic field, such that means can be energised in turn to induce a magnetic field in a detector, wherein in a first step the sensor arrangement measures the background field in the absence of any current in the wire or solenoid, such that the angle of the pivot point can be determined from the magnetic field in the solenoid and the background field.

Preferably, the means is a secondary coil and each secondary coil is coupled to a respective primary coil, which primary coil is located in proximity to or fixed to a magnetic sensor arrangement, wherein a magnetic field is induced into each secondary coil in turn such that the angle of the secondary coil to the primary coil can be determined.

Preferably, at least one of the pivot points is a shaft. Preferably, the sensor arrangement comprises a pair of coils adapted to measure orthogonal magnetic fields, a Hall sensor or a magnetic resistance. Preferably, the secondary coil is driven by a solenoid, which solenoid is powered by an air-electric motor. Preferably, each solenoid is energised by its associated primary by use of resonance. Preferably, each solenoid is energised by its primary by use of a threshold so that no field is produced unless only the primary located adjacent to the solenoid is energised.

Preferably, a fixed coil is provided at a known angle, which coil can be energised to check that system values have not drifted.

The invention concerns the use of an evoked response field whether alternating or steady whereby the angle is determined by the difference in field when the evoking magnetic stimulus is present from when it is absent. By turning the field on and off the difference is solely due to that field and each shaft can have its own separate field which can be turned on and off. The known commercially available magnetic sensors use feedback mechanisms to determine the shaft angle, whereas in the solution according to the invention this is achieved by measuring differences in the magnetic fields. The core of the sensor arrangement will typically be a disc or ring. By this means the energising of the solenoid attached to each shaft allows the shaft position angle to be measured one at a time, each in turn.

An exemplary embodiment of the invention will now be described in greater detail with reference to the drawings in which:

FIG. 10 shows a second slider switch The basic means to create an evoked or measuring field is shown in FIG. 1 where X and Y and Z are axes at right angles to each other and the XY plane is that of the detectors. In the invention, a field is applied in the Z axis and which, clearly from FIG. 1, has no component in the XY plane. By means of an attachment to a shaft whose axis is also in Z, the field is distorted by means of the asymmetry of the attachment so as to make a component in the XY plane which can be used to measure the shaft angle, which is the angle that the shaft makes with respect to the Z axis.

Figures 1, 2, 3:
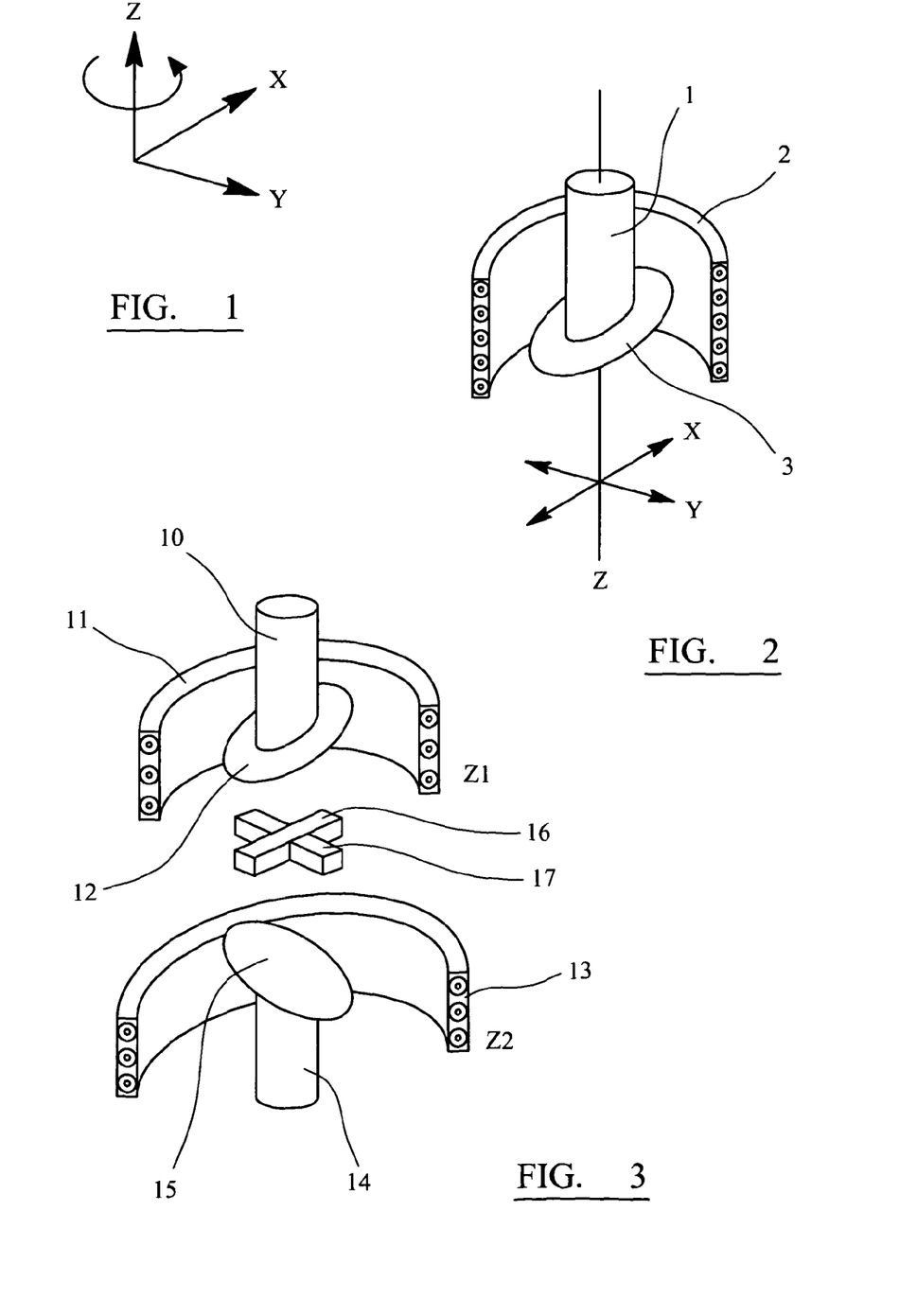
FIG. 1 shows schematically the orthogonal axes.
FIG. 2 shows schematically a detail of the sensor arrangement
FIG. 3 shows a schematic an arrangement with two shafts

FIG. 2 shows schematically a pivotable shaft 1 attached to a ferromagnetic ring or disc 3 located in a coil 2 of a metal conductor such as copper. The ring or disc of ferromagnetic material is attached to the shaft 1 but the plane of the disc is set at an angle to the XY plane. By canting the material, 3, as shown in FIG. 2, the field due to coil 2, which would normally have no component in the XY plane the shaft 1, has a field with a vector in the XY plane which rotates in that plane as the shaft rotates on its Z axis.

The coil 2 acts as a solenoid and creates a field in the Z axis but the canted disc or ring 3 distorts the field so that some of the Z field appears in the XY plane and therefore the angle of the shaft is calculable. If the ring or disc 3 were not canted the detectors are positioned so that there would be no output due to the symmetry of construction.

In the arrangement shown in FIG. 2 the magnetometers operate so as to reveal the shaft angle if the field is either alternating or steady. In the case of an alternating field the asymmetric component acts as the core of a transformer and couples the primary Z (coil 2 and shaft 1) into the X and Y detector secondaries. The X and Y detectors need not be windings but could also be discrete magnetometers. However, if the X and Y detectors respond only to steady fields then the solution still applies. The advantage of this over the permanent magnet case described in the preamble is that the stimulating field due to the Z coil can be turned on and off and the difference in output of the magnetometers is due solely to the shaft angle and ambient fields are removed from the calculations.

FIG. 3 shows the invention applied to two adjacent shafts. The first coil generally referred to as Z1 comprises a first shaft 10 is located within a coil 11 and has a disc of ferromagnetic material 12 mounted on the shaft 10 at an angle to the Z axis. The second coil, generally shown as Z2, comprising a second shaft 14 is located within a coil 13 and is provided with a distorting attachment 15 at its upper end. Orthogonal sensors 16, 17 are shown schematically between the two shafts 10 and 14. In this example and others which follow the shafts are shown similarly in order to show the operation with very close shafts whether they are coaxial or not. One practical example of such an arrangement is to be found in a marine twin engine lever control device.

In FIG. 3 the energising of coil Z1 11 causes a field in the Z axis which is distorted by the component 12 on the upper shaft 10. The shaft angle is then found from the magnetic components found by the sensors 16 and 17 in the XY plane due to Z1. Similarly when that field is off and coil Z2 12 is energised the same detectors can be used to derive the angle of the lower shaft 14 due to its distorting attachment 15. The three states of both Z1 and Z2 off, Z1 only on and Z2 only on enable the same detectors to measure the shaft angles separately and without interference from background fields which can be subtracted.

However there is a further problem between the two field distorting components. This problem arises whether the implementation is with alternating fields or with steady fields and whatever magnetometers are used in the XY plane. The problem is that the angle of the material on the end of the upper shaft 10 will have some distorting effect on the field due to Z2 when the angle of the lower shaft is being found. Such cross-talk may be small enough to be acceptable.

In the examples above there can be a solid fixed object between the end of the shaft and the magnetometers and the Z coils can be on the magnetometer side of that fixed object so that no electrical parts are on the shaft side. The advantage of a steady field is that the operation can take place through sealed bulkheads of non-magnetic material which can include metal. The operation of an alternating field implementation may suffer from eddy-current loss with the insertion of a conducting bulkhead.

Figure 4:
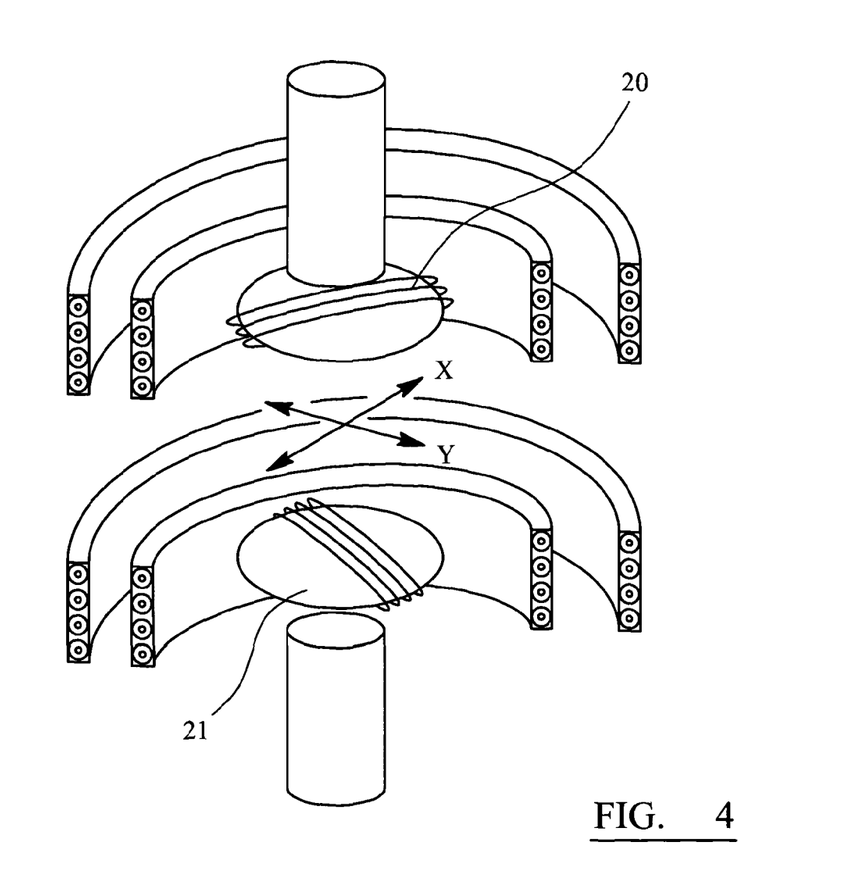
FIG. 4 shows a further, alternative embodiment

FIG. 4 shows a further embodiment adapted to address the problem of cross-talk. FIG. 4 shows the same arrangement as FIG. 3 but with the ferromagnetic material arranged with axial symmetry in a plane parallel to the XY plane. In this way the rotation of either shaft has no distortion of the stimulating field and so there is no cross-talk.

Figure 5:
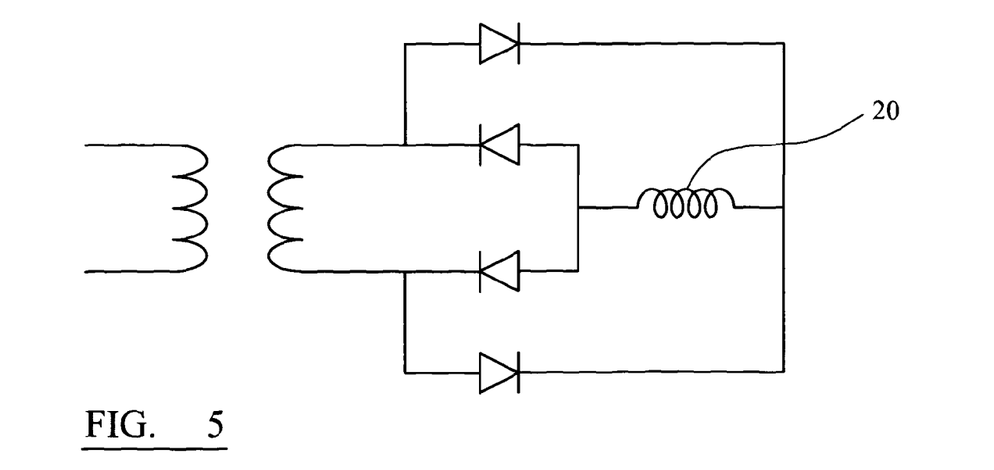
FIG. 5 shows a control circuit

A winding 20 is applied to the disc or ring 12 which winding, when energised, turns the ring or disc into a magnet with poles across a diameter at right angles to the winding. The field from this magnet allows the shaft angle to be measured. The current to energise this winding is derived from the axial field coils by transformer action. A second Z coil 21 is added to the rotating part and supplies power by transformer action. The coupling can be enhanced by resonant techniques and separation can be enhanced by having different resonant frequencies for different shafts. The output power is fed directly to the winding or indirectly by electronics. If the power supplied to the winding is alternating the detectors in the XY plane are similar and even the transformer action described previously could apply. Such electronics can include for rectification so that the current in winding 20 is steady giving rise to a steady magnetic field detectable by low-frequency detectors. In this final case the stimulating field is alternating and applied to the primary windings 11 or 21 and secondary windings 13 and 21 to put power into the winding 20. The electronic content can include a threshold means for eliminating weak currents in winding 20 so that there is zero cross-talk. An exemplary control circuit for this embodiment is shown in FIG. 5.

In use, each coil has from time to time some current imposed in it by a control unit adapted to measure the output of the magnetic sensor. The sensor system can measure the strength of the magnetic field in the absence of current in any of the coils from which it can measure the values of field due to any background source—such measurements being $M_{xb}$ and $M_{yb}$ in the respective axes x and y.

When one coil on a shaft P has a field imposed in it there will be a change in the values on each axis of the sensor. These new values can be called $M_{xp}$ and $M_{yp}$. In addition the second shaft Q can have its associated coil energised and the sensors will respond with new values, say $M_{xq}$ and $M_{yq}$.

In the above the magnetic vector for the field due to shaft P is $M_{xp}$-$M_{xb}$ on the x axis and $M_{yp}$-$M_{yb}$ on the y axis. The angle is given by the inverse tan of these two values.

Similarly the vector for the angle of shaft Q is the inverse tan of $M_{xq}$-$M_{xb}$ and $M_{yq}$-$M_{yb}$.

The vector subtraction can be analogue means, digital arithmetic or by magnetic means. In the magnetic case, the background fields $M_{xb}$ and $M_{yb}$ are driven to zero by feedback in the form of current in coils surrounding the sensor. The feedback current is maintained at the value needed to null the background while readings are taken of $M_{xp}$ and $M_{yp}$. In this instance no subsequent subtraction is needed as it has already been done at source.

In addition to the above a fixed coil R at a known angle can be energised so as give an assurance that the system is correctly functioning and can used to calibrate the system. Thus for the two shaft system the sequence can be A measure the background
B measure the angle of P
C measure the angle of Q
D check that the system values have not drifted (by energising R)

Once the system has been calibrated, the same steps can be taken to validate the system or check the system integrity, which is particularly useful in case of later interference.

In addition the energising of the shafts is arranged so that from time to time none of the coils is energised so that the magnetic sensor system may take a value of the co-ordinates of the residual or background field. These values can then be used to offset or correct any subsequent readings of fields caused by solenoid excitation so that the solenoid angle determination is not affected by any external fields. Such a field subtraction may be performed electrically by subtraction of the voltage or current, by means of digital arithmetic or by magnetic means in which the background field is applied by feedback directly as current in coils in the sensor so that the background field is nulled at the sensor itself.

Additionally, the energising of a fixed solenoid may be incorporated in the sequence above so as to provide a reference or calibration reading.

As the background field is being constantly monitored and eliminated, external fields do not interfere with the operation of the device. In step A above, by measuring the background it can eliminated by effectively using the sensor 7 as a null sensor to increase the gain. When the sensor is disabled the high gain thus achieved enables very small magnetic fields to be measured, which in turn means that weak electromagnets can be used as the weaker fields can still be detected.

Although the invention has been specifically described above in relation to a dual lever mechanism with co-axial shafts, it would be possible for the shafts to comprise effectively just the pivot points of the lever if a joystick type embodiment is preferred. For purely electrical driven systems, this option has advantages. The invention has further application in environments where a control system is required that is contactless on two sides of a sealed unit. An example of this is a Jacuzzi™ control, where the dials can be mounted on the inside of the Jacuzzi and the controlling shafts outside the Jacuzzi. This has the advantage that no sealing arrangement is required behind the controls.

Also the energisation of the solenoids may be performed by non contact means. In this arrangement the current for each solenoid is obtained from the secondary of a circular transformer constructed such that the secondary is also attached to the shaft and the solenoid but the primary is fixed and does not rotate. Thus the shaft turns without the constraint of wires and the secondary voltage can be rectified and applied to the solenoid. Each shaft is preferably be provided with its own transformer consisting of a secondary fixed to the shaft and a fixed primary. Each solenoid can then be energised selectively. Such selection is enhanced by the relative proximity of the secondary to its own primary, by magnetic screening, by the use of transformers each made resonant to a different primary frequency and/or by the use of threshold components within the network of rectifiers in the connection between the secondary and its solenoid as shown in FIG. 5.

In this embodiment, the sensor can comprise a floating magnetic core. The floating magnetic core comprises an annulus of magnetic material in a housing that is partially filled with a liquid. The annulus of magnetic material can either be attached to a float or alternatively depending on the properties chosen of the liquid and magnetic material can float directly on the liquid. In this way the annulus will remain in a horizontal plane with respect to the Earth's magnetic field. The shaft with the secondary winding can then be placed in proximity to the magnetic core. The shaft can either be positioned such that it can rotate and/or pivot and can therefore function as a joystick. Alternatively the housing could be installed with a permanent cant so that any rotation of the housing is measurable.

FIG. 6-9 show a further exemplary embodiment of a rotary control. FIG. 6a-c shows schematically the main magnetic elements of the rotary control. The power is obtained by a resonant winding 60 on a ferrite shaft 61 where the ferrite is 15 mm long and 1.5 mm in diameter. Power is received into this resonant arrangement by end to end induction from another ferrite shaft, the other side of the panel. At right angles to the shaft is a ring of magnetic material 62. The ferrite goes through the ring so as to be as close to the panel as possible. The ring contains windings 63 so as to create a field on a diameter of the ring. The impedance of these windings may not be appropriate for the power coupler resonant arrangement and so can be matched either by a separate winding on the ferrite, or by a split capacitor arrangement. Typical operation is at 25 kHz. By using a sine at this frequency the potential to cause electromagnetic interference is minimised. It is important that the ferrite winding resonant frequency needs to be precise to ensure inter-changeability and the current method is to size the resonant capacitor so that in production the resonance is likely to be higher than the target value. By measuring the resonance achieved a parallel padding capacitor can be added so as to ensure that it meets the specification.

Figures 6A, 6B:
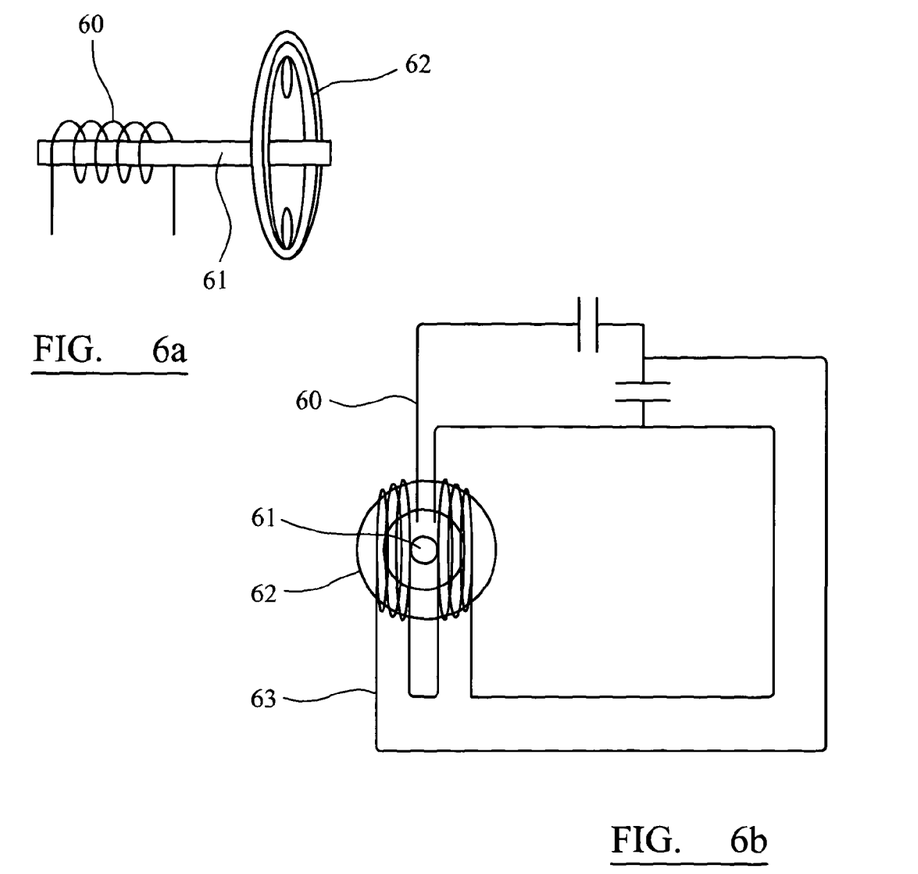
FIGS. 6a-c shows schematically the main magnetic elements of the rotary control
Figure 6C:
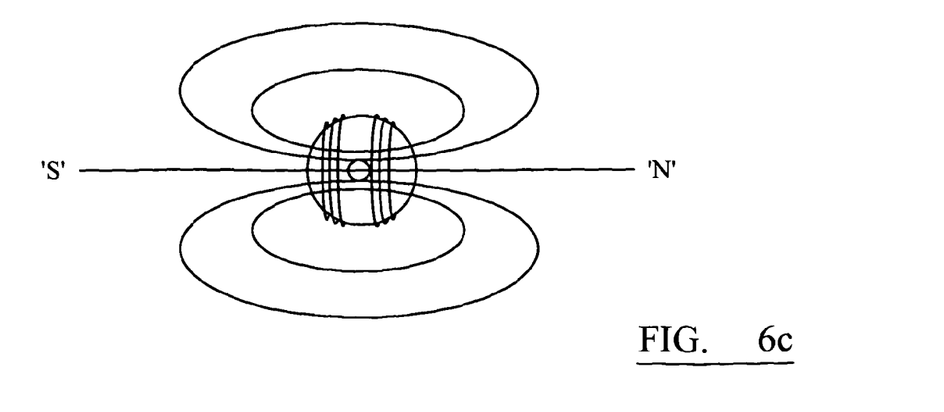
Figure 7:
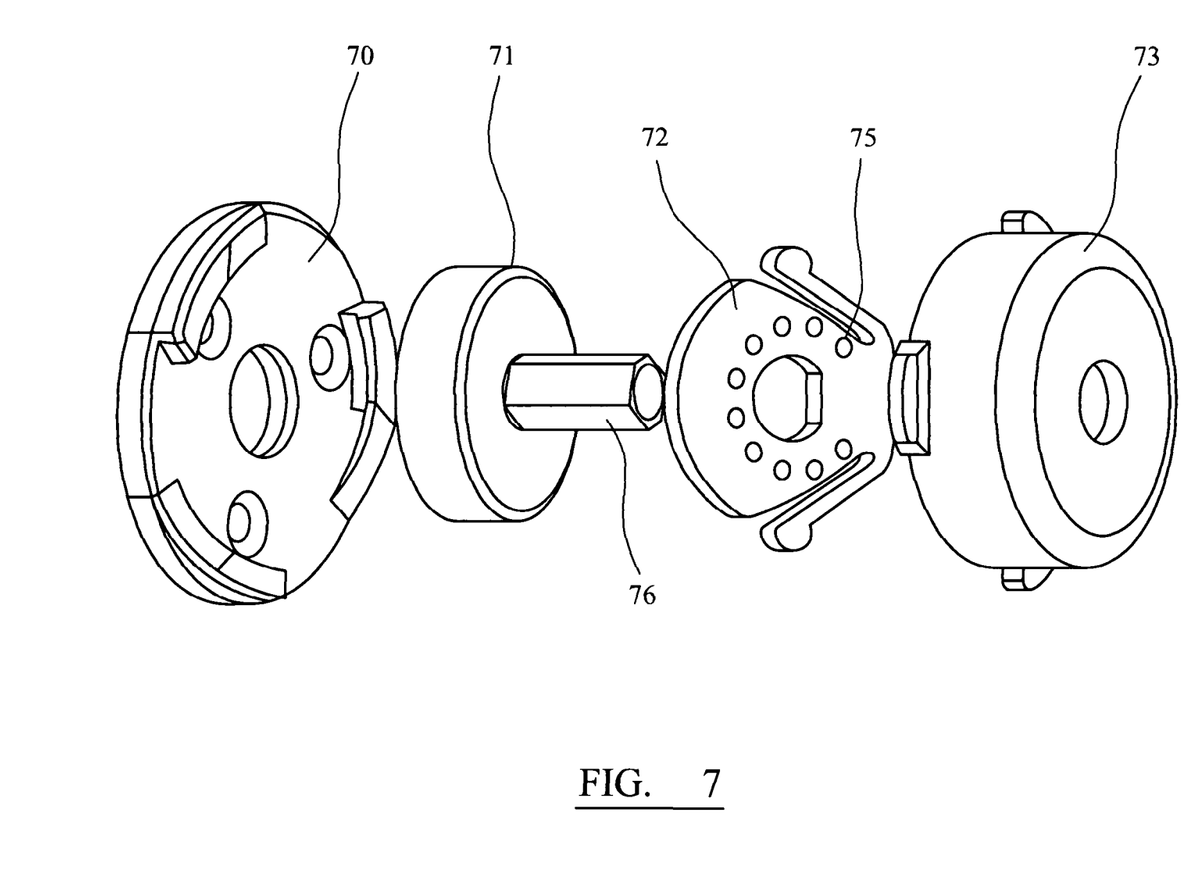
FIG. 7 shows an exploded view of the internal parts of a rotary control

FIG. 7 shows an exploded view of the internal parts of a rotary control that in use would be enclosed within a housing. These components are shown in FIG. 7 comprising a base 70, a rota (as described in FIG. 6) 71, a bearing component 72 and a cover 73. The bearing component 72 provides two bearings for the rota, as well as detent and angle limits. Detent is provided by means of a sprung tooth on the rota component which engages in a series of notches on the inside of the shell. A shaft angle is limited by a number of pegs 75 normally which would co-inside with the number of notches on the rota. The shell contains a stop so that by removing pegs the permitted angle of rotation is increased. Typically the notches inside the shell will be at a pitch of 30 degrees to one another and there would be pegs on the rota also at 30 degrees. This would allow the component to be used as a rotary switch of 30 degree index angle and of total number of positions limited by the pegs left on the rota. All the pegs can be removed for continuous rotation and the pitch of the notches on the shell can be changed. The notches may be minimised to provide a continuous yet gritty arrangement or they can be removed altogether so as to provide some friction due to the tooth and the spring, giving an action similar to that of a conventional rotary potentiometer.

This embodiment houses the ferrite rod and its winding within a 6.4 mm moulding 76 capable of having catalogue knobs attached to it to facilitate this the embodiment includes a flat on the shaft. The shell or housing is fixed to the base by moulding details that allow it to be twisted in. A tongue on the base locks to prevent it undoing. The tongue can be pressed down to release if modifications are required.

The base is attached to the panel either by screws underneath the shell, or by screws in extensions to the base outside the shell diameter or alternatively in many applications it will be glued the base to the panel.

The embodiment described in FIG. 7 could also be used with a push button. In this case a push button can be included in the top of the shell or housing 73, which is biased away from the rota by one or more springs. The button engages with a cam, which cam is adapted to co-operate with the rota. When the button is depressed, the cam causes the ferrite rod to rotate and this action generates a signal that can be used to actuate.

Figure 8:
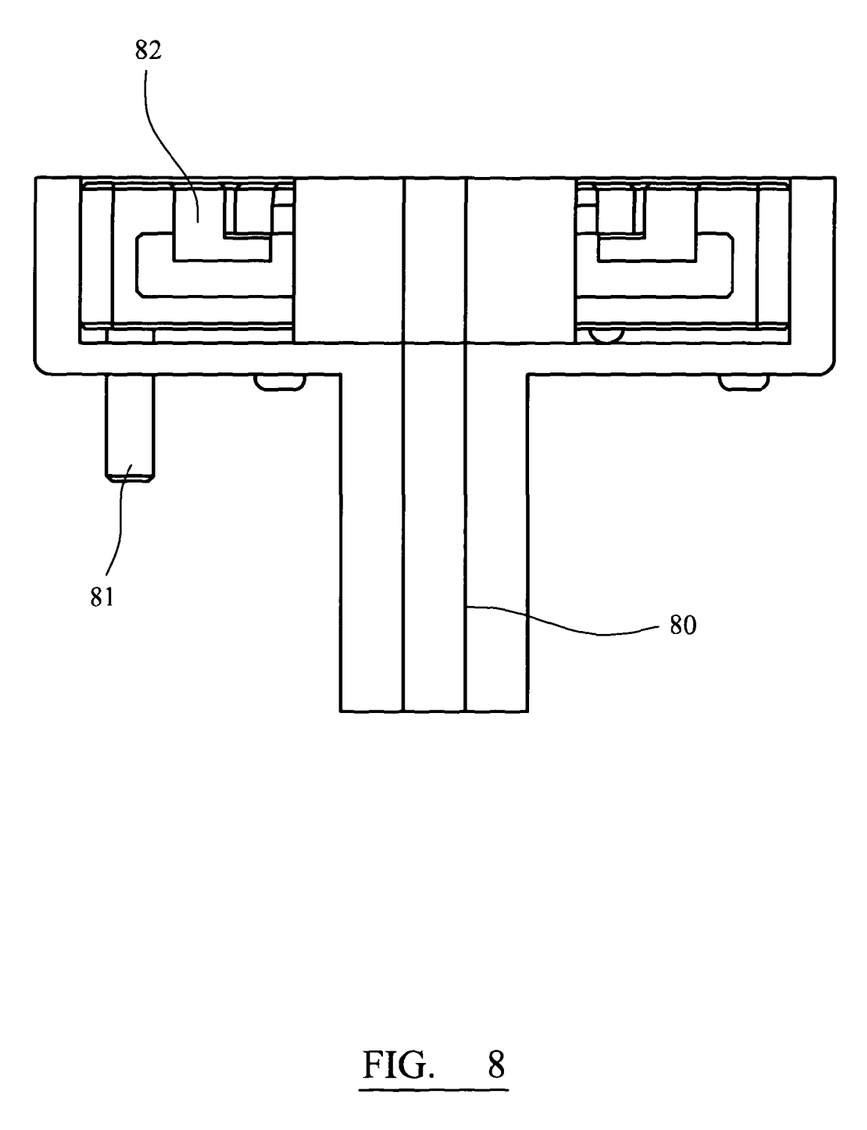
FIG. 8 shows the detector component in cross-section

FIG. 8 shows the detector component that, in the installed position, resides behind the panel. Each detector contains its own micro as well as the power transmitter to energise the knob rota to which it is aligned. The power coupler is a ferrite rod 80, orthogonal to the panel plain and of similar size to that in the rota. Pin 81 is used to help positioning and the windings 82 are wound around a magnetic ring. It is resonantly energised when the angle of the associated rota is to be determined each detector energises in turn within any given cluster of sixteen. Each micro is uniquely assigned an address at the time that it is programmed in situ. There are two modes of operation for the detector micro, one stand alone and two externally commanded.

For the stand alone mode, when there is only one detector, it will energise the rota at regular intervals and on the printed circuit board (PCB) of the detector, outputs will appear. A single pin is provided which is available as an analogue output which will vary from zero to plus 5 v. In addition, a connector contains pins which individually will be asserted as the rota traverses the, for example, 30 degree index intervals. The software of the micro can contain a zeroing ability, whereby contact on the detector is closed when the rota is at the zero position. The micro will have been programmed to have the same indexing angle software as the mechanical detent on the shell and rota.

For the externally commanded mode, when a cluster of detectors is employed, an external command PCB organises which detector energises its power coupler at any given time. The micro in the external command module sends messages to the array cluster of detectors and receives back their responses. It can then reformat this information in a standard RS232 manner at an appropriate data rate for computer interface. It will command detectors whose rotas are moved frequently more often than those which are moved infrequently so as to optimise the cluster.

The operation of the detector is by detecting in a phase sensitive manner the output from the magnetically active ring in its rota. In a similar manner to that of the rota, it is best to have the energising ferrite as close to the panel as possible to maintain symmetry, any magnetics associated with the detector should be symmetrical so that any magnetic distortion caused by the misalignment of one detector with another does not cause angular errors. In this embodiment a ring of new metal is used which contains quadrant coils—opposite coils are connected so as to produce no output with circulating fields but will produce output with fields on a diameter. The rota produces a field on the diameter on which its coils are wound so that by determining the direction of the vector from the quadrature windings on the detector ring, the direction through a full 360 degrees of the rota can be determined. The output of each of the two phase-sensitive detectors is fed to an analogue to digital converter within the micro.

To enhance the sensitivity the following improvement enhances the signal-to-noise. Where there is a transformer method used and the power for the 'knob' part is being sent at the same time as detecting the returned signal there can be considerable local signal from the power transmitter compared to weak return. As the return is synchronous any leakage of power signal to the detector is perceived as an error angle of the knob.

Figure 9:
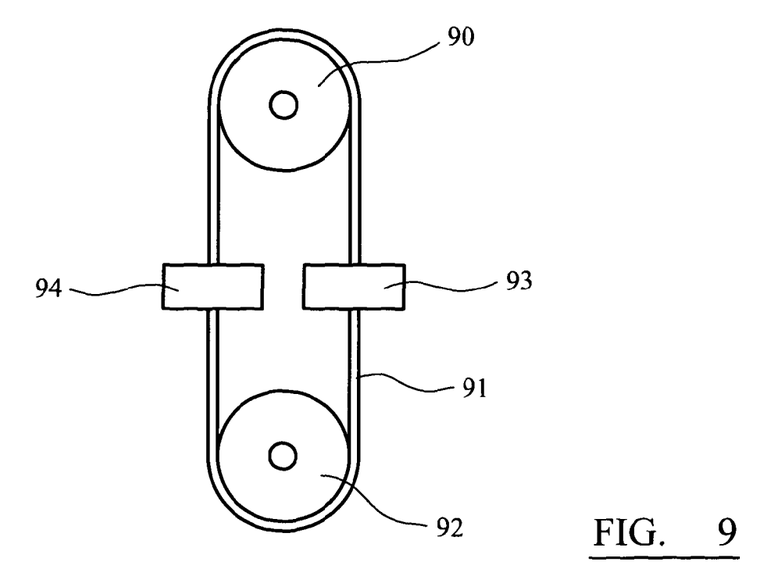
FIG. 9 shows a first slider switch
Figure 10:
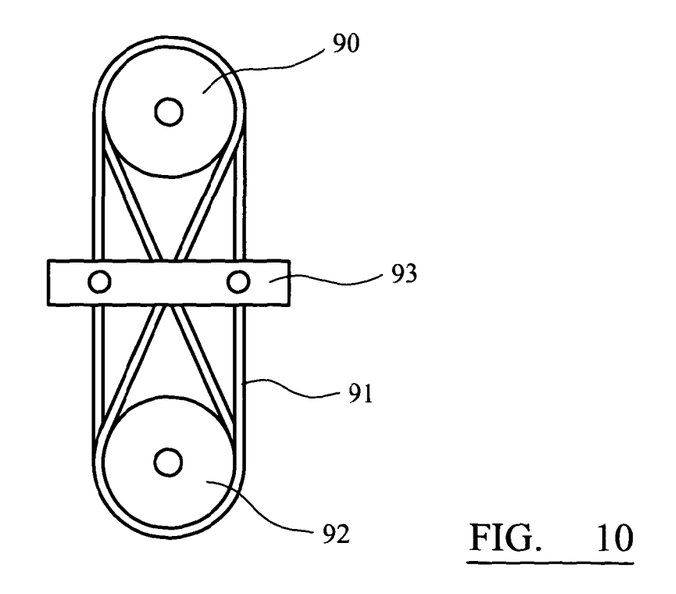

To reduce this the return signal can be generated after the power burst has stopped. A small controller in the knob is powered from the transmitted power and some of this power is stored in the knob—on a capacitor. Once the power transmission has ceased the processor continues to drive the angle windings at the same frequency and phase as the power signal. It will have synchronised its output before the power transmission stops. By this means the detector is unburdened from the leakage and can have a high gain so as to sense the knob angle without errors from field distortion and leakage FIGS. 9 and 10 show a further embodiment in which the rotary control is incorporated in a slider switch arrangements. Slider switches are commonly used in a number of applications, in particular in the music industry. One problem with slider control is that there is inevitably an open slot which can accumulate dust and dirt. A particular problem is that the sensitive control electronics are not closed to the atmosphere and so if coffee or another liquid is spilt on the slot, it can cause considerable damage.

In the embodiment of FIG. 9 the slider control comprises a rotary switch 90, as described above, which is connected by a belt 91 to an idler pulley 92. An actuator 93, 94 is attached to each arm of the belt. In use, when either of the actuators 93 or 94 is moved up or down, the rotary switch 90 will rotate and this gives rise to a detectable signal. As the control electronics for the switch 90 will be located behind the panel, there will be no problem with liquid ingress.

FIG. 10 shows an alternative embodiment to that of FIG. 9, in which the belt is crossed and a single actuator is provided.

The invention claimed is:

1. A magnetic angle sensor system for determining a shaft angle comprising at least one pivotable shaft pivotable about a Z-axis, wherein:
   a. said pivotable shaft is provided with a magnetic field generator configured to create a magnetic field;
   b. said pivotable shaft is provided with a magnetic sensor able to measure a component of said magnetic field lying along an X-axis that is perpendicular to said Z-axis and a component of said magnetic field lying along a Y-axis that is perpendicular to said X-axis and said Z-axis;
   c. said pivotable shaft is provided with a distorting component configured to pivot with said pivotable shaft, said distorting component configured to distort said magnetic field so that said magnetic field is non-symmetric with respect to said Z-axis;
   d. said magnetic sensor measures a background field in the absence of any current in said magnetic field generator, and said magnetic sensor measures a magnetic field in the presence of a current in said magnetic field generator, such that said shaft angle of said pivotable shaft can be determined from a difference between said measurement in the presence of a current in said magnetic field generator and said measurement in the absence of a current in said magnetic field generator.

2. A magnetic angle sensor system according to claim 1, wherein said distorting component is a ferromagnetic object that is attached to said pivotable shaft and is inclined with respect to said Z-axis.

3. A magnetic angle sensor system according to claim 1, wherein said magnetic sensor is selected from the group consisting of a pair of coils adapted to measure orthogonal magnetic fields and a Hall effect sensor.

4. A magnetic angle sensor system according to claim 1, wherein said magnetic field generator is a coil.

5. A magnetic angle sensor system according to claim 4, wherein said magnetic sensor is selected from the group consisting of a pair of sensor coils adapted to measure orthogonal magnetic fields and a Hall effect sensor.

6. A magnetic angle sensor system according to claim 1, wherein said distorting component is a ferromagnetic disc that is inclined with respect to said Z-axis.

7. A magnetic angle sensor system according to claim 1, further comprising:
   a. a second pivotable shaft;
   b. a second distorting component connected to said second pivotable shaft and configured to pivot with said second pivotable shaft, said second distorting component configured to distort said magnetic field so that said magnetic field is non-symmetric with respect to said Z-axis;
   c. a second magnetic field generator proximate said second distorting component; and
   d. said magnetic sensor being configured to measure a background field in the absence of any current in said magnetic field generator and said second magnetic field generator, and said magnetic sensor being configured to measure a magnetic field in the presence of a current in said second magnetic field generator.

8. A magnetic angle sensor system according to claim 7, further comprising a rotary control.

9. A magnetic angle sensor system according to claim 7, further comprising a slide control.

10. A magnetic angle sensor system for determining a shaft angle comprising at least one pivotable shaft, wherein:
    a. said pivotable shaft is provided with a magnetic field generator configured to generate a magnetic field, such that said magnetic field generator can be turned on and off;
    b. said pivotable shaft is provided with a distorting component configured to pivot with said pivotable shaft and configured to distort said magnetic field so that said magnetic field is non-symmetric about said pivotable shaft; and
    c. said pivotable shaft is provided with a magnetic sensor configured to measure a background field in the absence of any current in said magnetic field generator, and said magnetic sensor is configured to measure a magnetic field in the presence of a current in said magnetic field generator, such that said shaft angle of said pivotable shaft can be determined.

11. A magnetic angle sensor system according to claim 10, wherein said magnetic sensor is selected from the group consisting of a pair of coils adapted to measure orthogonal magnetic fields and a a Hall effect sensor.

12. A magnetic angle sensor system according to claim 10, wherein said distorting component is a ferromagnetic object that is attached to said pivotable shaft and is inclined with respect to said pivotable shaft.

13. A magnetic angle sensor system according to claim 10, wherein said magnetic field generator is a primary coil located around said at least one pivotable shaft.

14. A magnetic angle sensor system for determining a shaft angle, wherein said shaft angle is defined with respect to a Z axis and said shaft angle is determined using a magnetic measurement along an X-axis that is perpendicular to said Z-axis and a Y-axis that is perpendicular to said X-axis and said Z-axis, wherein said magnetic angle sensor system further comprises:
 a. a first pivotable shaft pivotable about said Z-axis, said pivotable shaft including a distorting component configured to distort a magnetic field so that said magnetic field is non-symmetric about said Z-axis;
 b. a second pivotable shaft pivotable about said Z-axis said pivotable shaft including a second distorting component configured to distort a magnetic field so that said magnetic field is non-symmetric about said Z-axis;
 c. a first coil surrounding said first pivotable shaft, said first coil configured to create a magnetic field proximate said first pivotable shaft when current flows through said first coil;
 d. a second coil surrounding said second pivotable shaft, said second coil configured to create a magnetic field proximate said second pivotable shaft when current flows through said second coil;
 e. a magnetic sensor configured to measure a magnetic field strength along said X-axis and a magnetic field along said Y-axis; and
 f. said magnetic sensor being configured to measure a background field in the absence of any current in said first and second coils, and being configured to measure a magnetic field in the presence of current in said first coil such that said shaft angle of said first pivotable shaft can be determined.

15. The magnetic angle sensor system of claim 14, wherein said distorting component included in said first pivotable shaft is a piece of ferromagnetic material that is inclined with respect to said Z-axis.

16. The magnetic angle sensor system of claim 15, wherein said distorting component included in said second pivotable shaft is a piece of ferromagnetic material that is inclined with respect to said Z-axis.

17. The magnetic angle sensor system of claim 14, wherein said first and second coils are made up of copper.

18. The magnetic angle sensor system of claim 14, wherein said magnetic sensor is selected from the group consisting of a pair of coils adapted to measure orthogonal magnetic fields, a Hall effect sensor, and a magnetometer.

\* \* \* \* \*